United States Patent
Overton et al.

(10) Patent No.: US 7,322,122 B2
(45) Date of Patent: Jan. 29, 2008

(54) METHOD AND APPARATUS FOR CURING A FIBER HAVING AT LEAST TWO FIBER COATING CURING STAGES

(75) Inventors: Bob Overton, Lenoir, NC (US); Ling Li, Mooresville, NC (US)

(73) Assignee: Draka Comteq B.V., Amsterdam (NL)

( * ) Notice: Subject to any disclaimer, the term of this patent is extended or adjusted under 35 U.S.C. 154(b) by 510 days.

(21) Appl. No.: 10/208,861

(22) Filed: Aug. 1, 2002

(65) Prior Publication Data

US 2003/0039749 A1 Feb. 27, 2003

Related U.S. Application Data

(63) Continuation-in-part of application No. 08/784,014, filed on Jan. 15, 1997, now abandoned.

(51) Int. Cl.
*F26B 19/00* (2006.01)
*B05D 3/02* (2006.01)

(52) U.S. Cl. .............................. 34/61; 34/62

(58) Field of Classification Search ................. 34/275, 34/278, 60, 61, 62; 118/641; 427/493, 513
See application file for complete search history.

(56) References Cited

U.S. PATENT DOCUMENTS 3,409,460 A    11/1968  Mitchell et al.

(Continued)

FOREIGN PATENT DOCUMENTS

DE    G85 11 384.1    10/1988

(Continued)

OTHER PUBLICATIONS

Patent Abstracts of Japan, Publication No. 05-213636, published Aug. 24, 1993; Fujikura, Ltd.

(Continued)

*Primary Examiner*—Jiping Lu
(74) *Attorney, Agent, or Firm*—Sughrue Mion, PLLC

(57) ABSTRACT

The present invention provides a method and apparatus for curing a coated fiber, comprising either two fiber coating curing stages separated by a cooling stage, or two fiber coating curing stages separated by a distinct time interval, or both. One of the two fiber coating curing stages responds to the coated fiber, and provides a partially cured fiber coating. The other of the two fiber coating curing stages responds to the partially cured coated fiber for further curing the coating of the fiber. In one embodiment of the invention, a cooling stage is placed between the two curing stages, while in the other the curing stages are placed a set distance apart such that polymerization of the coating initiated by the first curing stage has time to complete prior to the coating being irradiated by the second curing stage. The cooling stage is used to actively remove heat generated during the cure process from the fiber coating, while the time delay is used to allow complete polymerization to occur before subsequent irradiations. These embodiments of the present invention can be used separately or in combination to achieve optimal fiber coating cure.

14 Claims, 11 Drawing Sheets

U.S. PATENT DOCUMENTS

| | | | |
|---|---|---|---|
| 4,479,984 A | 10/1984 | Levy et al. | |
| 4,636,404 A | 1/1987 | Raffel et al. | |
| 4,636,405 A * | 1/1987 | Mensah et al. | 427/493 |
| 4,738,868 A | 4/1988 | Fischer et al. | |
| 4,761,168 A | 8/1988 | Blyler, Jr. et al. | |
| 4,913,859 A | 4/1990 | Overton et al. | |
| 4,966,615 A | 10/1990 | Linden et al. | |
| 5,092,264 A | 3/1992 | Overton et al. | |
| 5,366,527 A | 11/1994 | Amos et al. | |
| 5,568,728 A | 10/1996 | Sapsford | |
| 5,593,736 A | 1/1997 | Cowen et al. | |
| 5,636,307 A | 6/1997 | Cowen et al. | |
| 5,733,607 A | 3/1998 | Mangum et al. | |
| 5,756,165 A | 5/1998 | Ali et al. | |
| 5,763,003 A | 6/1998 | Bonicel et al. | |
| 5,885,652 A | 3/1999 | Abbott, III et al. | |
| 6,190,483 B1 | 2/2001 | Yang et al. | |
| 6,218,004 B1 * | 4/2001 | Shaw et al. | 428/336 |

FOREIGN PATENT DOCUMENTS

| | | |
|---|---|---|
| DE | 4022234 A1 | 1/1992 |
| DE | 42 26 344 A1 | 2/1994 |
| EP | 0247659 | 12/1987 |
| EP | 0 261 856 | 3/1988 |
| EP | 0519300 A1 * | 12/1992 |
| EP | 0 616 843 A2 | 9/1994 |
| EP | 0 706 871 A1 | 4/1996 |
| EP | 0 854 022 A1 | 7/1998 |
| EP | 0854 121 A1 | 7/1998 |
| GB | 2 287 244 A | 9/1995 |
| JP | 4-224144 | 8/1992 |
| JP | 5-213636 | 8/1993 |
| WO | WO 89/02420 | 3/1989 |

OTHER PUBLICATIONS

Abstract/Zusammenfassung/Abrege 03016623.5.

Patent Abstracts of Japan, Publication No. 04224144, Aug. 13, 1992, Sumitomo Electric Ind. Ltd.

XP-002063223—Derwent 93-299461.

XP-002063224—Derwent 92-319971.

* cited by examiner

METHOD AND APPARATUS FOR CURING A FIBER HAVING AT LEAST TWO FIBER COATING CURING STAGES

BACKGROUND OF THE INVENTION

The present application is a Continuation-in-Part of U.S. application Ser. No. 08/784,014, filed on Jan. 15, 1997 now abandoned.

FIELD OF THE INVENTION

The present invention relates to an apparatus for producing optical fiber and cable wiring; and, more particularly, relates to an apparatus for producing optical fiber and cable wiring which includes drawing, cooling, coating and curing optical fiber and cable wiring.

BRIEF DESCRIPTION OF THE PRIOR ART

In the prior art, there are many different ways to produce fiber, and many different ways to draw, cool, coat and cure optical fiber. For example, U.S. Pat. No. 5,092,264, issued to the instant inventor, describes a device to filter out an infrared component of radiation emitted on the fiber by Ultraviolet (UV) curing lamps for the purpose of reducing the heat put into a fiber coating. The device consists of a double-walled, quartz center tube placed within the UV curing lamps through which the fiber passes as it is irradiated. The annulus of the tube is filled with water to absorb the infrared component, thus potentially speeding up the cure process by keeping the coatings cooler than otherwise would be the case.

U.S. Pat. Nos. 6,338,878 and 6,370,920, also issued to the instant inventor, describe method and apparatus to actively remove heat from the curing coating while the coating is inside the UV lamps in the flux of the irradiation. The heat of the cure reaction exothern and the heat from the irradiators absorbed by the coating is removed by an active crossflow of cooling gas, thus increasing the rate of polymerization.

In addition, both Fusion Systems, Inc., and Iwasaki Electric Co. offer "cold" reflectors or mirrors for UV irradiators. The reflectors reduce the infrared component of the radiation which is directed at the fiber coatings during curing. This is accomplished by the mirrors being coated with a deposited layer which reflects the desired UV component but not the infrared.

Additional methods for trying to increase the level of cure in optical fiber coatings can be found in U.S. Pat. Nos. 6,190,483, 5,636,307, and 5,756,165. In U.S. Pat. No. 6,190,483 the goal is to obtain a good surface cure of the coating followed by a good thru-cure of the coating. To accomplish this the coating is first exposed to an excimer UV light source emitting at a specific wavelength (i.e. 222 nm), then another emitting at a different wavelength (i.e. 308 nm), followed by a mercury-halide bulb emitting a broad spectrum of UV for an in depth cure. In U.S. Pat. No. 5,636,307 a similar process is used where a first irradiation occurs at about 290 nm with an intensity of 5,000 to 10,000 microwatts/$cm^2$ and a second cure occurs at about 360 nm with an intensity of about 2,000 microwatts/$cm^2$ to limit temperature rise in the matrix material. In U.S. Pat. No. 5,765,165 it is recognized that for faster draw speeds above 5 m/sec it is necessary to have additional UV irradiation to maintain the overall UV dose in order to obtain sufficient cure of the primary coating, and this additional irradiation is provided just off-line of the draw tower by irradiating the fiber on the take-up reel, or alternatively provided by irradiating the fiber later as it is removed from the take-up reel in a re-spooling operation. However, by failing to reach a substantially complete cure level in-line on the tower, the compression placed on the incompletely cured coatings by the draw capstan and its belt can deform the coating on the fiber, negatively affecting the geometry and performance of the fiber in optical fiber ribbon and cable structures.

U.S. Pat. No. 5,647,884 provides for a capstan belt of sufficiently soft mechanical properties that coating deformation can be reduced, but this apparatus does not address the cure level of the coating. The present inventors have found that it is necessary to obtain substantially complete coating cure in-line on the tower, and prior to the capstan, in order to provide optimum coating protection and performance without risking coating deformation by going through the capstan system in an under-cured state.

Having identified two mechanisms related to the kinetics of cure of the primary coating that determine the rate and completeness of coating cure, these two mechanisms are manipulated by the present invention to accomplish substantially complete cure in-line, on tower, and at high draw speeds.

It has been found during the production of optical fiber that the UV curable coating applied to the optical fiber will not completely cure when the coating is above certain temperatures. Therefore, no matter how many UV lamp cure stages are used to cure the optical fiber coatings, the optical fiber coating will not be completely cured when it is at a high temperature. It has also been found that the properties of the coating improve when cured at lower temperatures. It is hard to control the coating temperature because the UV lamps which are used to cure an optical fiber coating increase the temperature of the coating through the absorption of high-intensity UV and infrared (FR) radiation. Additionally, the coating cure process is an exothermic reaction (generating heat).

Some prior art devices allow the coating to become very hot, both from the excess UV energy absorbed by the materials and from the exothermic nature of the acrylate crosslinking cure reaction itself. Because of this, there has been little significant benefit realized from these methods in industrial applications.

An article entitled "Coatings Processing, Cooling Coated Fiber Between UV Lamps For Increased Coating Cure Speed", by B. Overton et al., describes how the development of desired coating cure levels is retarded by high temperature. The prior art does not describe a cooling medium between UV cure stages to provide a more complete cure.

Moreover, in addition to the adverse effects of heat generation during the curing process, the inventor has discovered that the interruption of polymerization by prematurely exposing the curing coating to a second coating irradiation is detrimental to the achievement of the desired fully-cured condition. Stated differently, it has been discovered that the cure kinetics of coating polymerization requires the polymerization process of an initial cure stage to be progressed as far as possible before initiating a second cure stage. Essentially, the premature exposure of an already irradiated coating to a second irradiation stage causes a sharp increase in the concentration of activated photoinitiator radicals prior to the completion of polymerization initiated by the first cure stage. The activated photoinitiator radicals combine with the radicals of the polymerizing species already active in the coating, causing premature termination of the polymerization and thus preventing a complete coating cure. Therefore, to further improve cure rates it is desirable to remove heat from a coating during polymerization and/or allow sufficient time for polymerization to progress between curing stages.

SUMMARY OF THE INVENTION

A first embodiment of the present invention provides a method and apparatus for curing a coated fiber, comprising at least two fiber coating curing stages and a cooling stage, and a second embodiment of the present invention provides a method and apparatus for curing a coated fiber, comprising at least two fiber coating curing stages separated by a specific distance or time.

In the first embodiment, the at least two fiber coating curing stages respond to the coated fiber, for providing a partially cured coated fiber, and further respond to a cooled partially cured coated fiber, for further providing a cured coated fiber.

The cooling stage responds to the partially cured coated fiber, for providing the cooled partially cured coated fiber.

In operation, this embodiment of the present invention provides a method of configuring UV cure lamps to provide a first UV irradiation, allow an initial cure level to be attained reaching the gel point of the coating, then actively removing the heat of the reaction and the heat absorbed from the first UV lamp. This is followed by additional UV exposure to complete the cure of the coatings. The advantage is that this allows complete cure of the coatings even at very high draw speeds. An efficient coated-fiber cooling tube is necessary to optimize the effect.

The cooling stage removes heat from an optical fiber coating between UV cure stages so that upon irradiation in subsequent UV cure stages, the optical fiber coating fully cures. The method includes the steps of: applying the coating to the optical fiber, passing the coated optical fiber through a first UV cure stage which partially cures the coating, passing a partially cured coated optical fiber through a cooling tube which reduces the temperature of the optical fiber and coating, and then passing the optical fiber through a subsequent UV cure stage.

This embodiment of the present invention does not seek to prevent the coatings from heating up during the cure process on fiber optic draw towers. This embodiment seeks to irradiate the coating material on the fiber in a curing stage, thus initiating the cure reaction, then actively remove the heat generated during the majority of the cure process, and irradiate the material again in a following curing stage to complete the reaction at a fastest possible rate.

In the second embodiment of the present invention, there are also at least two curing stages, but instead of, or in addition to, having a cooling stage or active cooling stage, the curing stages are spaced such that polymerization initiated by the first of the curing stages has time to progress to or near completion prior to the initiation of the second curing stage. In this embodiment, the spacing or time lapse between curing stages is dependent on both the speed of the drawn fiber passing through the curing stages and the distance between the end of the first curing stage and the beginning of the following curing stage.

The present invention provides a number of advantages. First, some of the UV cure stages may be eliminated. This adds a cost benefit of not requiring the use of additional UV cure stages and the associated equipment costs. Also, the maintenance cost associated with replacing the various component parts of the UV cure lamps are saved. An additional advantage of the invention is that the draw speed may be increased. Another advantage of the present invention is that the cure of the coated fiber can be accomplished to the full extent and with fewer UV lamps than otherwise necessary in the known prior art approaches.

It is further noted that the above two embodiments are not wholly independent of each other, and can be combined in various combinations to optimize the coating cure process. For example, it is contemplated that an embodiment of the present invention can include both an active cooling stage, as well as taking advantage of specific spacing or timing between curing stages to attain an optimal coating cure.

It is also noted that the present invention is not limited to applications in the fiber optic industry but has widespread applications in all industries requiring optimal polymerization of coatings, coating materials, or any polymeric materials cured by exposure to UV radiation, including but not limited to electrical cables and wiring, etc.

BRIEF DESCRIPTION OF THE DRAWINGS

The invention, both as to its organization and manner of operation, may be further understood by reference to the drawings (not drawn to scale) that include FIGS. 1-11 taken in connection with the following description.

DESCRIPTION OF THE BEST MODE OF THE INVENTION

It is noted that the following discussions of FIGS. 1 through 4 generally apply to the first embodiment of the present invention, while the discussions of FIGS. 5-11 generally apply to the second embodiment of the present invention. However, as noted above, it is contemplated that the first and second embodiments of the present invention can be combined in various ways by one of ordinary skill in the art to optimize the benefits of these embodiments, and equivalents thereof, without departing from the scope of the present invention.

Figure 1:
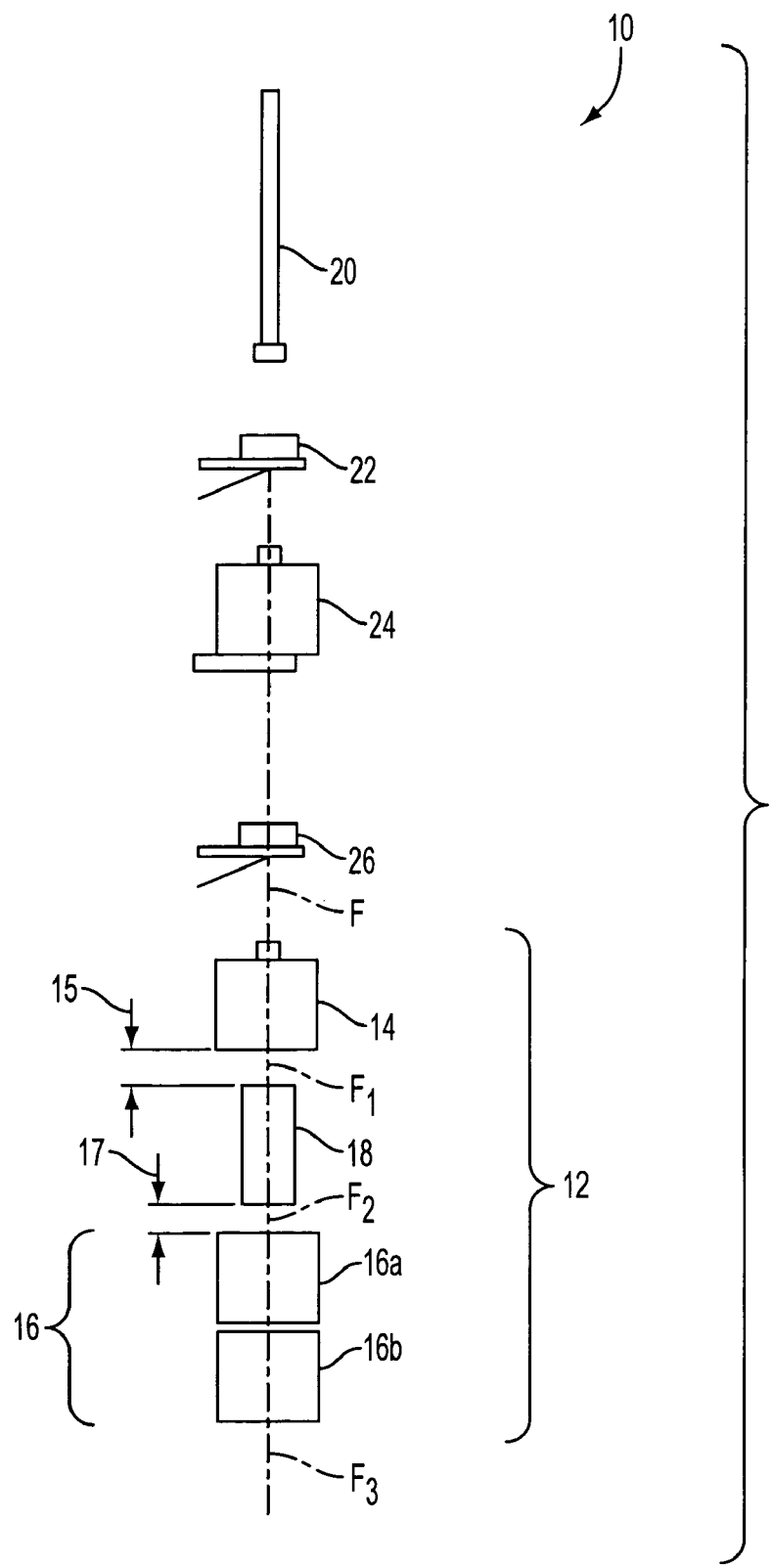
FIG. 1 is an illustration of the first embodiment of a UV lamp configuration which is the subject matter of the present invention.

FIG. 1 shows an apparatus in accordance with the first embodiment of the present invention for producing fiber generally indicated as 10. In its broadest sense, the invention consists of a method and apparatus that provides an improved UV curing stage generally indicated as 12 for curing a coated fiber F, comprising at least two fiber coating curing stages 14, 16 and a cooling stage 18.

As shown, the at least two fiber coating curing stages 14, respond to the coated fiber F, for providing a partially cured coated fiber generally indicated as $F_1$, and further, respond to a cooled partially cured coated fiber generally indicated as $F_2$, for further providing a cured coated fiber generally indicated as $F_3$.

The cooling stage 18 responds to the partially cured coated fiber $F_1$, for providing the cooled partially cured coated fiber $F_2$. The fiber coating curing stage 14 has one or more UV cure lamps. The fiber coating curing stage 16 has one or more UV cure lamps indicated as 16(a), 16(b). Each of the at least two fiber coating curing stages 14, 16 is separated from the cooling stage 18 by at least a one inch space generally indicated as 15, 17. The at least one inch spaces 15, 17 are entirely open to ambient atmosphere for open air cooling. At the one inch space 15 the temperature is in a range of 100-110 degrees Celsius, and at the one inch space 17 the temperature is less than 60 degrees Celsius. Embodiments are also envisioned wherein each of the secondary UV cure lamps 16(a), 16(b) are separated from one another by at least a one inch space.

In FIG. 1, the fiber producing apparatus 10 also includes a cooling tube 20, a primary coater 22, a primary UW curing stage having a primary UV cure lamp 24 and a secondary coater 26, which are all known in the art. As shown, the improved UV curing stage 12 is positioned after the secondary coater 26, which provides the coated fiber F. However, the scope of the invention is not intended to be limited to only such an embodiment, because FIG. 3 shows another embodiment in which the improved UV curing stage 12 is also positioned between the primary coater 22 and the secondary coater 26, as discussed below.

Figure 2:
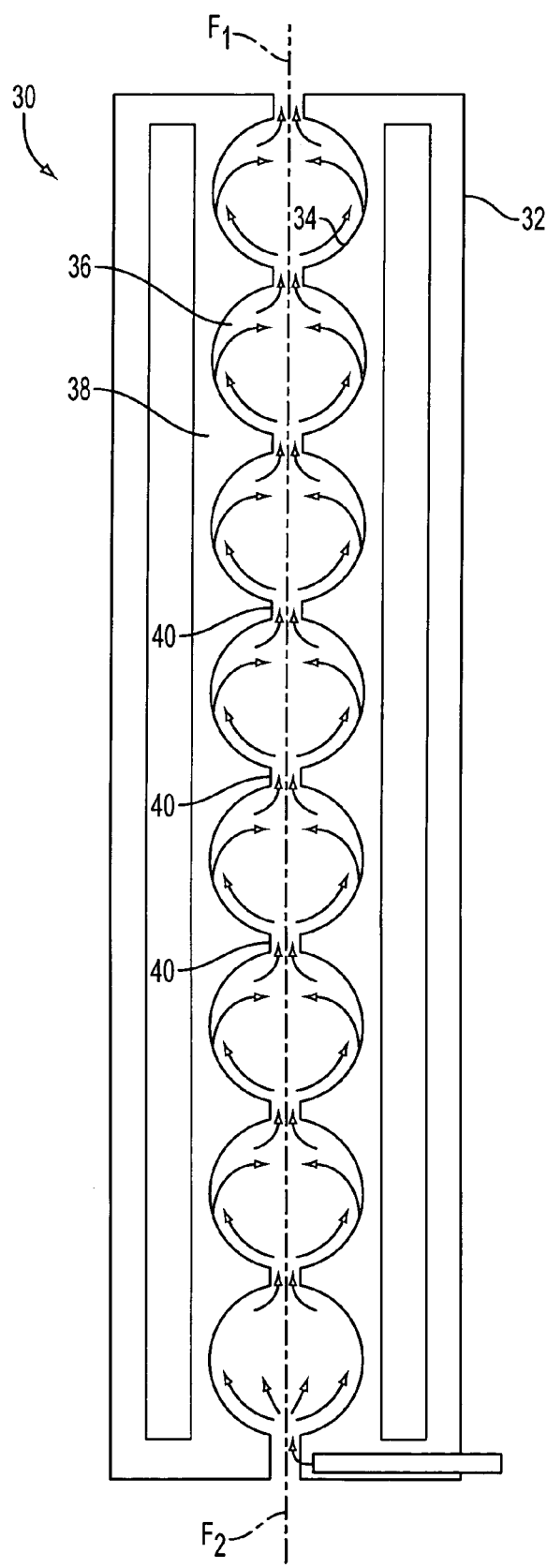
FIG. 2 is an illustration of a cooling stage for the first embodiment shown in FIG. 1.
Figure 2A:
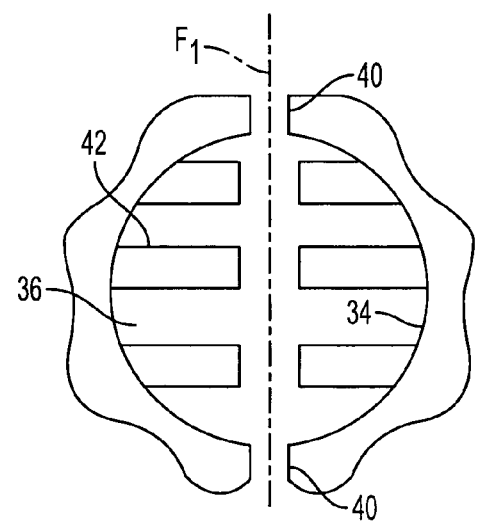

FIG. 2 shows the cooling stage 18 in FIG. 1 as an active cooling tube generally indicated as 30. The active cooling tube 30 is a hollow tube 32 having tube walls 34 through which a cooling gas flows, as generally indicated by the arrows shown in FIG. 2. The cooling gas acts as a heat transfer medium from the partially cured coated fiber $F_1$ to the tube walls 34 of the hollow tube 32. The cooling gas is helium, although the scope of the invention is not intended to be strictly limited to only this particular gas. As shown, the active cooling tube 30 consists of a series of cylindrical hollows generally indicated as 36 in a body of heat conducting metal generally indicated as 38 connected by narrow apertures generally indicated as 40. The series of cylindrical hollows 36 and narrow apertures 40 forms a path taken by the partially cured coated fiber $F_1$. As shown in FIG. 2a, the series of cylindrical hollows 36 have fingers 42 machined in such a way as to increase the surface area of the heat conducting metal 38 for absorbing the heat removed from the partially cured coated fiber $F_1$ by the cooling gas. The series of cylindrical hollows 36 and narrow apertures 40 through which the cooling gas flows provides turbulence to the flow of the cooling gas, thereby increasing the efficiency of heat transfer between the partially cured coated fiber $F_1$ and the tube walls 34 of the hollow tube 30.

Figure 3:
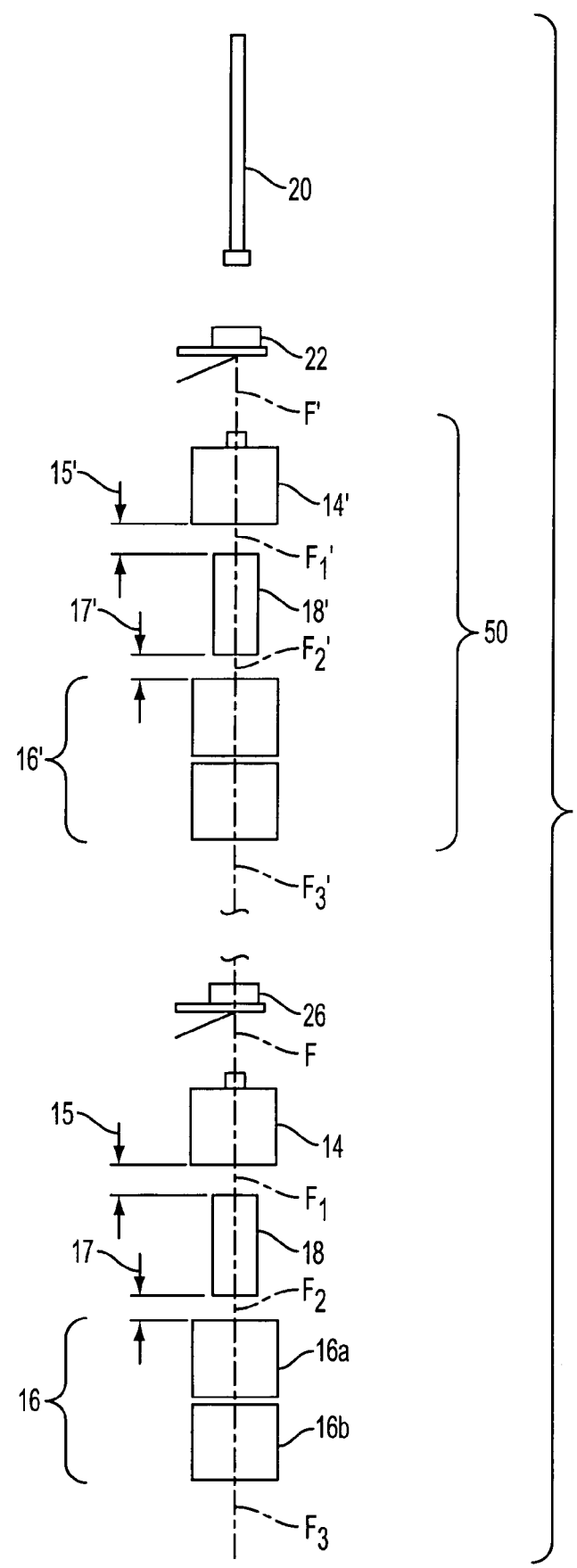
FIG. 3 is an illustration of an alternate configuration of the first embodiment of a UV lamp configuration which is the subject matter of the present invention.

FIG. 3 shows another embodiment of the improved UV curing stage having an improved UV primary curing stage generally indicated as 50. In FIGS. 1 and 3, elements that are similar in both figures are numbered with similar reference numerals. The improved UV primary curing stage 50 has at least two fiber coating curing stages 14', 16' and a cooling stage 18'. One of the at least two fiber coating curing stages 14' responds to a primary coated fiber from the primary coater 22, for providing a partially cured primary coated fiber. The cooling stage responds to the partially cured primary coated fiber $F_1'$, for providing a cooled partially cured primary coated fiber. The other of the at least two fiber coating curing stages responds to the cooled partially cured primary coated fiber, for providing a cured primary coated fiber to the secondary coater 26.

Figure 4:
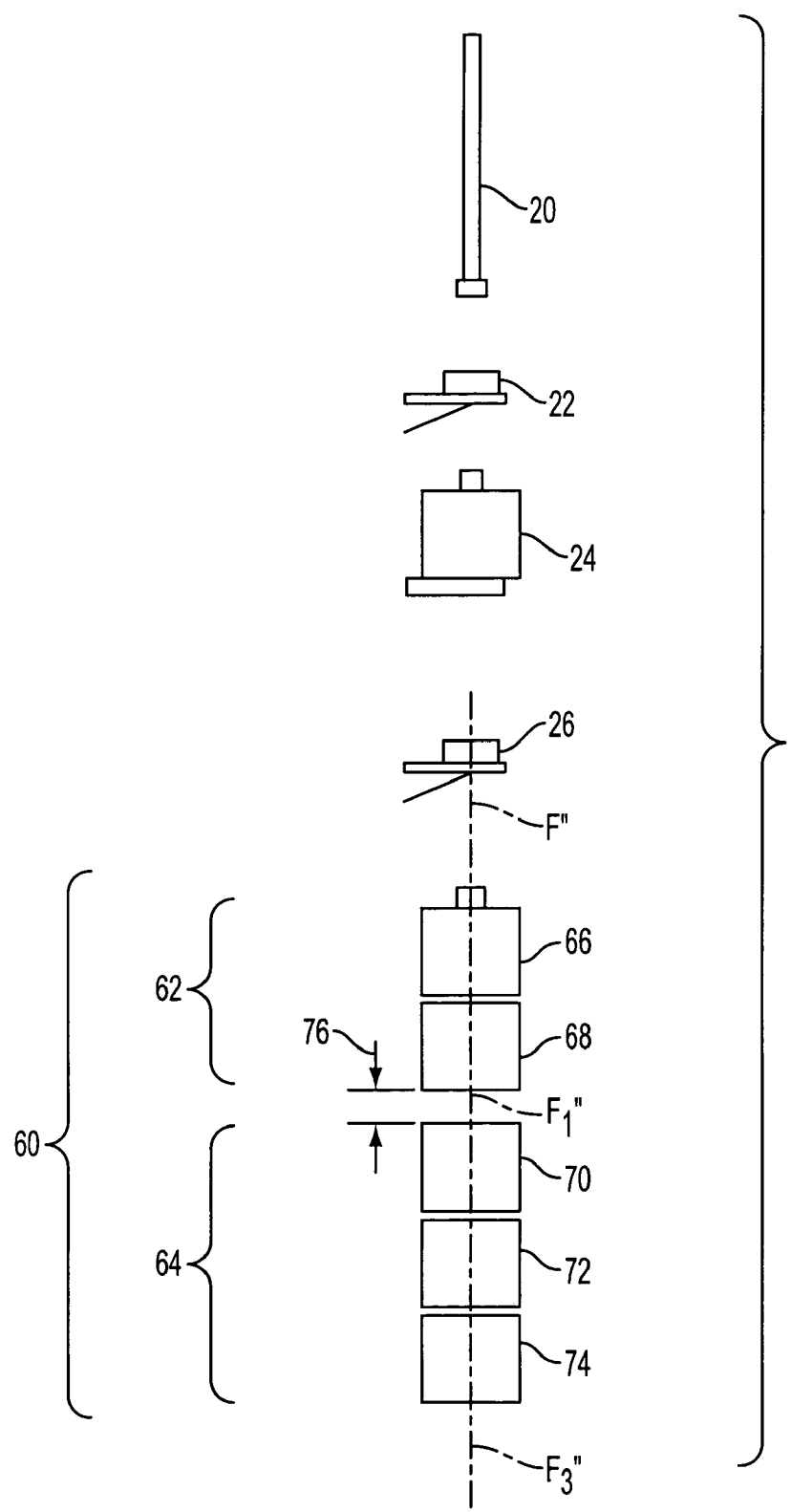
FIG. 4 is an illustration of still another alternate configuration of the first embodiment of a UV lamp configuration which is the subject matter of the present invention.

FIG. 4 shows another embodiment of the improved curing stage generally indicated as 60, having at least two fiber coating curing stages 62, 64. In this embodiment, the active cooling stage 18 in FIGS. 1-3 is replaced by a separation between the two fiber coating curing stages 62, 64 of at least a one inch space generally indicated as 76 for cooling a partially cured coated fiber generally indicated as $F_1''$.

One of the at least two fiber coating curing stages 62 includes two secondary UV cure lamps 66, 68. The other of the at least two fiber coating curing stages 64 includes three secondary UV cure lamps 70, 72, 74. The at least one inch space 76 is entirely open to ambient atmosphere. Embodiments are also envisioned wherein each of the secondary UV cure lamps 66, 68, 70, 72, 74 are separated from one another by at least a one inch space.

In the embodiment shown in FIG. 4, the improved curing stage 60 consists of positioning the UV lamps 66, 68, 70, 72, 74 in such a way that there is a distance between the lamps 66, 68, 70, 72, 74. This distance may be one inch of more. The space between the lamps 66, 68 and lamps 70, 72, 74 may be entirely open to the ambient atmosphere or it may be partially filled with a cooling device such as cooling device 30 in FIG. 3.

In summary, the UV lamps 66, 68, 70, 72, 74 are deliberately separated for the purpose of allowing heat to escape from the coatings between UV doses. The separation of the UV lamps 66, 68, 70, 72, 74 in FIG. 4 and interposition of the active cooling device 18 in FIGS. 1-3 increase the speed and efficiency of the curing reaction. The active cooling tube 18 is designed so as to increase the turbulence of the flow of the cooling gas for increased efficiency of heat transfer from the fiber or the coating.

Turning now to FIGS. 5-9, the second embodiment of the present invention will now be discussed. As stated previously, in addition to the benefits from cooling a fiber coating between curing stages (discussed above), the inventor of the present application has determined that spacing and/or the provision of dark-cure time between various curing stages can be beneficial in obtaining a complete fiber coating cure. Dark-cure time is defined as the period immediately following exposure to a UV lamp during which the polymerization reaction proceeds in the absence of initiating irradiation.

Most existing configurations of UV lamps for curing coatings on optical fiber draw towers (as well as other applications) stack UV lamps together on the spine of the draw tower. This can be seen in FIG. 8. It has been widely considered that the larger the number of the UV lamps used, the more complete the coating cure would become, as the line speed is increased. For example, it has been previously considered that when there is a 25% increase in the line (or draw) speed of the fiber, this increase in speed can be offset by a 25% increase in the amount of UV irradiation needed on the tower to effect a proper cure. This is often accomplished by adding more UV lamps. The thinking is that the total amount of cure on a fiber coating remains constant. For example, if the current configuration of the tower uses 4 UV lamps a 25% increase in the effectiveness for coating cure could be accomplished by adding a $5^{th}$ lamp. However, the inventor of the present application has discovered that this is not the case.

Laboratory studies have indicated that a fiber coating, particularly the primary fiber coating, requires only a brief initial UV exposure which initially activates photoinitiators in the coating, followed by a predetermined amount of dark cure time before the coating is exposed to a second curing stage. In fact, an experiment was conducted where an initial primary coating cure UV lamp was followed by five secondary coating cure UV lamps. During this experiment it was discovered that the level of cure of the fiber's primary coating increased progressively as each one of the secondary lamps was turned off, progressively. For example, in the original test configuration there were 5 lamps positioned one after the other on the tower to irradiate the coating, and in subsequent tests as each lamp immediately following the first lamp was turned off, it was noticed that the final level of cure increased, even though the total amount of UV irradiation is reduced. It was determined that as the time between the end of the first irradiation and the beginning of the subsequent irradiation was increased the overall level of cure was increased.

By allowing a maximum amount of dark cure time possible on a draw tower between the first and second, and following, UV lamps (for either the primary or secondary fiber coatings) the optimal cure can be obtained. This is because the polymerization which is begun by the first irradiation is allowed to progress to or near its completion prior to interference from newly formed photoinitiator radicals created by a following irradiation. In the prior art, UV lamps were grouped very close to each other in an effort to save space on the draw tower. This would mean that the fiber coating would be irradiated by a second curing stage prior to the progress to or near completion of the polymerization initiated by a preceding curing stage. Essentially what occurs is that the photoinitiator radicals created by the second cure stage interrupt or interfere with the polymerization step that is taking place because of the preceding cure stage. The photoinitiator radicals newly created in the second irradiation participate in a combination reaction with the radicals of the growing polymer network and prematurely terminate the growth of the network. This interruption prevents some, if not all, of the initial cross-linking from taking place, thus resulting in an incomplete cure. By allowing the polymerization process initiated by the initial cure stage to complete or become substantially completed then the above problems are avoided.

Through experiments it has been determined that the minimum amount of dark-cure time needed to obtain the benefits of the present invention is approximately at least 40 msec, whereas in prior art configurations the time between cure stages is typically 5 to 10 msec. This is 40 msec of time where the coating is not exposed to any UV irradiation, or the time it takes for a point on the fiber coating to travel from the exit of the first UV lamp to the entrance of the following UV lamp. More preferably, the dark-cure spacing is to be at least approximately 100 msec. Thus, the optimal time of spacing is at least approximately 100 msec. It is noted that the scope of the present invention is not intended to be limited to a particular maximum time between successive irradiations.

It is noted that longer times would also be desirable, but the height constraints of existing draw towers may limit the spacing possible. Slowing the draw speed of the tower can accomplish extending the time between UV irradiation stages as well. It is further noted that the above referenced dark-cure times may be modified or optimized on other draw tower configurations by changing the draw speed or spacing between cure stages. In many common draw tower configurations a maximum dark-cure time limit of 300 msec is practical due to draw tower height constraints. It is also noted that the benefits of the present invention can be utilized for any number of coatings or layers of coatings on a single fiber. For example, a duplicate configuration of this embodiment can be used for both a primary and secondary fiber coating. Finally, the types of coating materials used may also affect the optimal length of dark-cure time needed to ensure complete polymerization after the first partial cure, however, the above times are deemed optimal for all commonly known and used coating materials, and the optimum dark-cure times can be changed depending on the coating materials used.

It is also noted that because of the drawbacks of curing fiber coatings on the take-up reel or even after the take up reel, the present invention is to be used where the curing of the fiber coating is completed on-line.

This embodiment of the present invention will now be discussed with reference to the Figures. It is noted that the elements, such as the cure stages, etc. shown in FIGS. 5-9 are intended to be the same as those discussed previously regarding FIGS. 1-4, and can be any commonly known or used devices. Further, these Figures can be combined with any of the embodiments of the first embodiments shown in FIGS. 1-4, as well as others.

Figure 5:
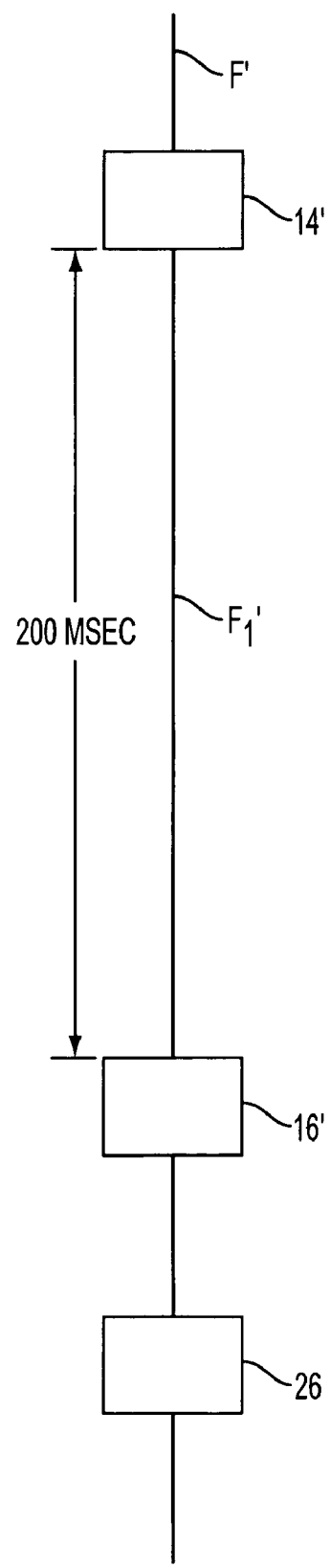
FIG. 5 is an illustration of a UV lamp configuration in accordance with the second embodiment of the present invention.

FIG. 5 is diagrammatical representation of the second embodiment of the present invention, where a number of the components shown in FIGS. 1-4 are not repeated in this Figure to avoid redundancy. In this embodiment, the drawn fiber F' enters the primary coating unit and the primary coating is initially irradiated by a first primary UV lamp 14'. This cure stage initiates polymerization in the coating of the fiber $F_1$'. After the coated fiber exits the first primary UV lamp 14' it travels for approximately 200 msec before entering the second primary UV lamp 16'. This time lapse (which is dependant on distance and draw speed) allows the polymerization initiated by the first curing stage to progress (dark cure) to or near completion before the irradiation by the second curing stage begins. After exiting the second primary UV lamp 16' the fiber then enters a secondary coater 26 to apply a secondary coating. It is noted that the times shown in this Figure (and the others) are merely exemplary in nature and are optimally at least approximately 40 msec, or as otherwise needed to ensure that the initial polymerization progresses to or near completion before the second irradiation takes place. All of the remaining aspects of the fiber draw process can remain as those previously discussed or as known in the industry.

Figure 6:
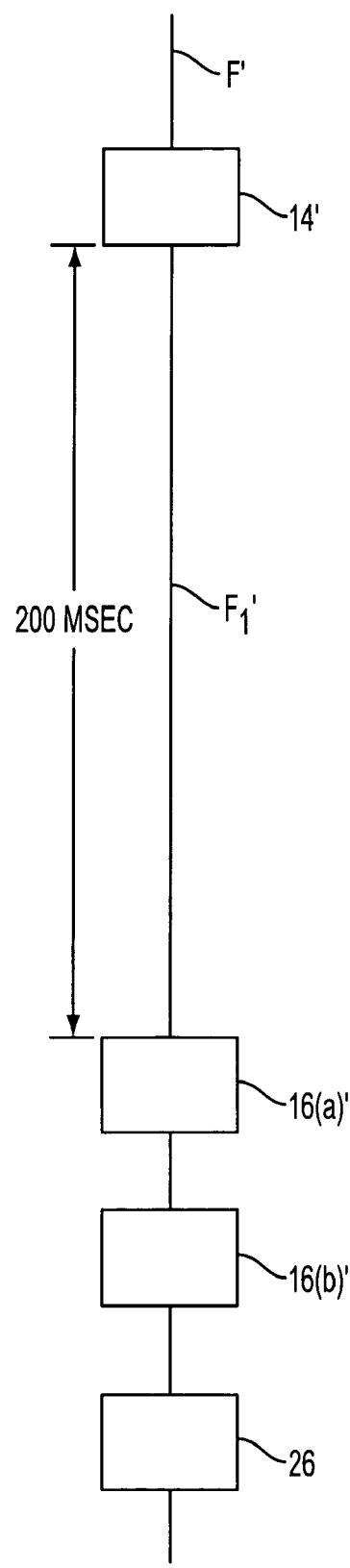
FIG. 6 is an illustration of an alternate embodiment of the UV lamp configuration of the second embodiment shown in FIG. 5.
Figure 7:
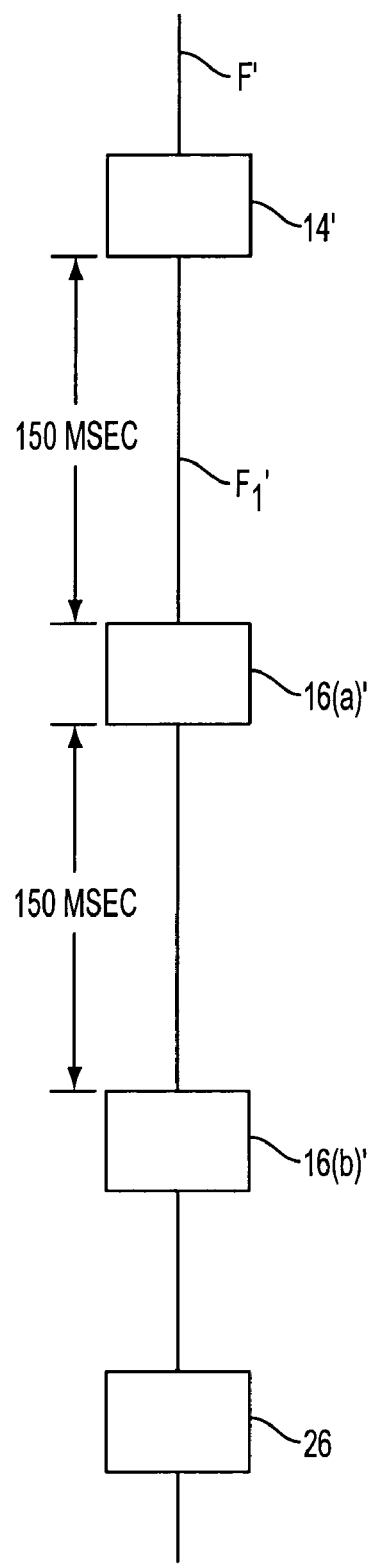
FIG. 7 is an illustration of yet another alternate embodiment of the UV lamp configuration of the second embodiment shown in FIG. 5.

FIG. 6 is an alternate configuration of the second embodiment of the present invention, where again the coated fiber $F_1$' travels for approximately 200 msec without UV exposure, after the first primary UV lamp 14', and before a second exposure in a second primary UV lamp 16(a)', followed by a third exposure in a third primary UV lamp 16(b)'. It is noted that although the third primary UV lamp 16(b)' is shown shortly following the second primary UV lamp 16(a)', if space permits, it is contemplated that the time of no UV irradiation of the fiber coating between the second and third irradiation stages could also be increased to optimize cure. An example of this is shown in FIG. 7, where the dark-cure spacing/timing between the three stages 14', 16(a)' and 16(b)' are made at 150 msec. This optimizes cure times between the UV lamp stages while taking into account the limited amount of draw tower space. It is again noted that a time lapse of at least approximately 100 msec is most desirable, however, in this embodiment the distances are optimized taking into account the limited space available. It is also noted that the exact spacing may vary depending on the speed of the traveling fiber and the cure response of the coating materials, and that the optimal dark-cure times should be selected such that the polymerization initiated by the preceding curing stage should progress to or near completion prior to the exposure to a subsequent curing stage.

Figure 8:
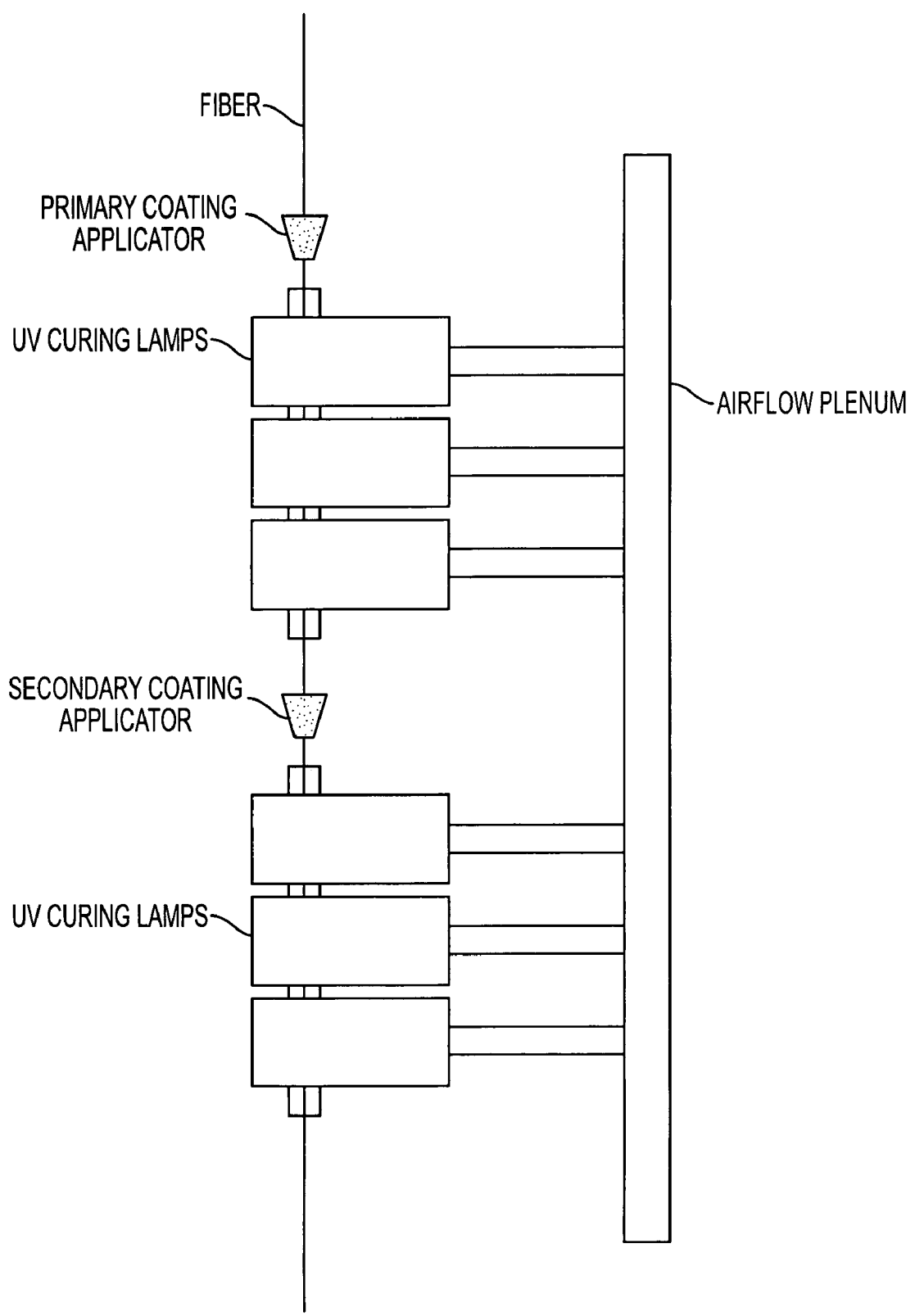
FIG. 8 is an illustration of a commonly known and used UV lamp configuration.

FIG. 8 discloses an example of UV lamp configuration based on prior art, where the principal objective is to maximize the amount of UV dose delivered to the coatings on the fiber F' while minimizing the space required on the draw tower for the lamp systems. Typically, the set of lamps for curing the primary coating comprises more than one lamp, and the lamps are stacked as closely together as possible. The lamps also typically share a single, long center tube (not shown), a quartz tube inside the UV lamps that is aligned parallel to the direction of the fiber draw process and with the coated fiber traveling down the center of the cross section of this tube. The purpose of this tube is to isolate the coated fiber from the force of the airflow required to cool the UV lamps. The coated fiber may have, depending on the draw speed less than 5 msec of time between consecutive exposures to the direct UV irradiation of the stacked lamps.

Figure 9:
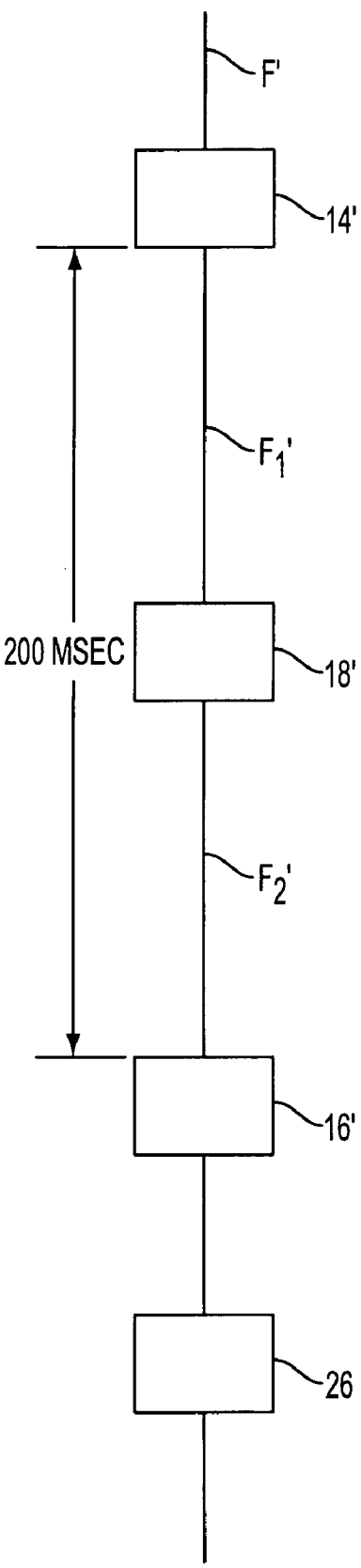
FIG. 9 is an illustration of a UV lamp configuration combining both the first and second embodiments of the present invention.

With regard to FIG. 9, a portion of a fiber curing apparatus is shown combining both the first and second embodiments of the present invention. It is noted that this Figure is merely intended to demonstrate that the embodiments discussed above may be combined in an effort to optimize fiber coating cure, but is not intended to be limiting in the scope of the present invention in any way. In this Figure, it is shown that the fiber $F_1'$ exits the first primary UV lamp 14' and is then cooled by the cooling stage 18' as the polymerization proceeds (dark-cure) to or near completion, the progress aided by removing the exothermic heat during the reaction. This cooling stage can be active, and otherwise have the characteristics of the cooling stage previously discussed regarding FIGS. 1-4. Further, the cooling stage 18' can be placed at any point between the first primary UV lamp 14' and the second primary UV lamp 16'. However, more desirably the cooling stage 18' should be positioned closer to the exit of the first primary UV lamp 14' to remove the exothermic heat of reaction earlier in the polymerization step. After the fiber $F_1'$ exits the cooling stage 18' the fiber $F_1'$ then enters the second primary UV lamp, which is optimally positioned such that at least approximately 40 msec (and more preferably at least approximately 100 msec) expires between the time at which the fiber $F_1'$ exits the first primary UV lamp 14' and the time at which the fiber enters the second primary UV lamp 16'.

Figure 10:
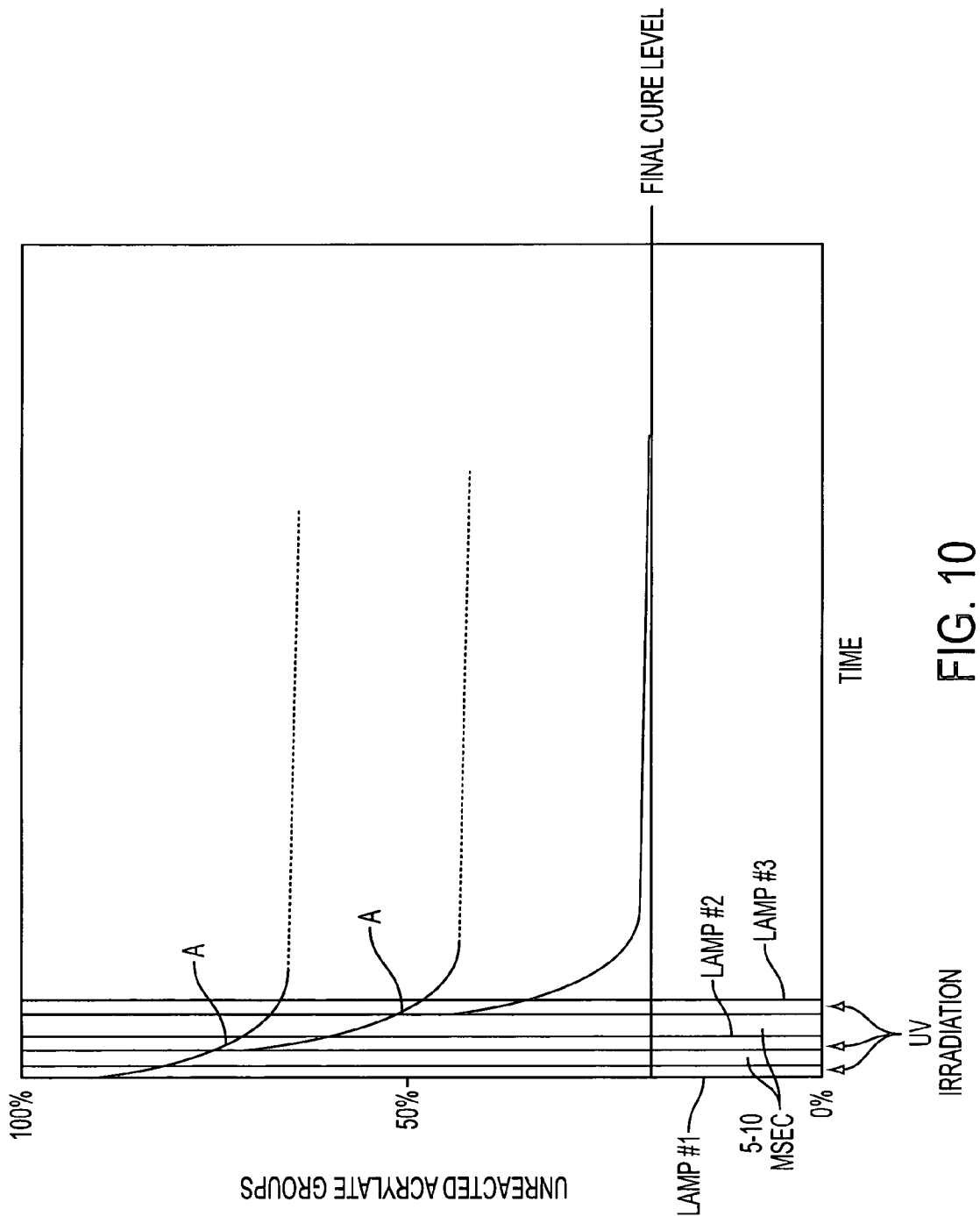
FIG. 10 is a cure graph showing the percentage of unreacted acrylate as a function of time with conventional UV lamp spacing.

FIG. 10 is a cure graph obtained by Fast Fourier Transform Infrared Spectropscopy (FTIR) showing the relative concentration of unreacted acrylate groups in a fiber coating as a function of time and treatment. The graph depicts real time absorbance at the 810 wavenumber peak in the infrared spectrum during the time the coating is irradiated from three successive UV lamps. Each of the complete individual curves depicts the cure of acrylate groups as if there is only a single irradiation. However, as shown in this graph, because irradiation from a following lamp interrupts the cure taking place, the final cure level leaves a significant percentage of unreacted acrylate groups in the coating. In the prior art as depicted in FIG. 10, a coating starts with 100% unreacted acrylate groups and is then irradiated by a first lamp for a set amount of time which initiates the cure of a first amount of acrylate groups. If left alone, this cure reaction would proceed as illustrated to asymptotically approach zero rate of chain growth. At that point, although the cure reaction initiated by the first irradiation is substantially complete, much of the original quantity of acrylate groups remains unreacted. Full reaction is not achieved with one irradiation of the primary coating because the polymerization mechanism is in competition with termination mechanisms that eventually bring the process to a halt. Thus, further irradiation is required to move towards full cure, noting that there is a distinction between the polymerization process that is initiated by one irradiation becoming "substantially complete" and the coating achieving "full cure".

However, as shown, prior to the cure reaction of these first-initiated groups becoming substantially complete, the irradiation of the coating by the second lamp (at the point A) interrupts the dark-cure polymerization initiated by the first lamp. The second irradiation occurs well before the first polymerization step has approached its limit. The new free radicals (from the second UV cure stage) compete between initiating new polymerization and combining with the existing free radicals on the live ends of the growing polymer network, truncating that growth. The third lamp has the same effect on the polymerization initiated by the second lamp, as the second lamp has on the polymerization initiated by the first lamp.

Figure 11:
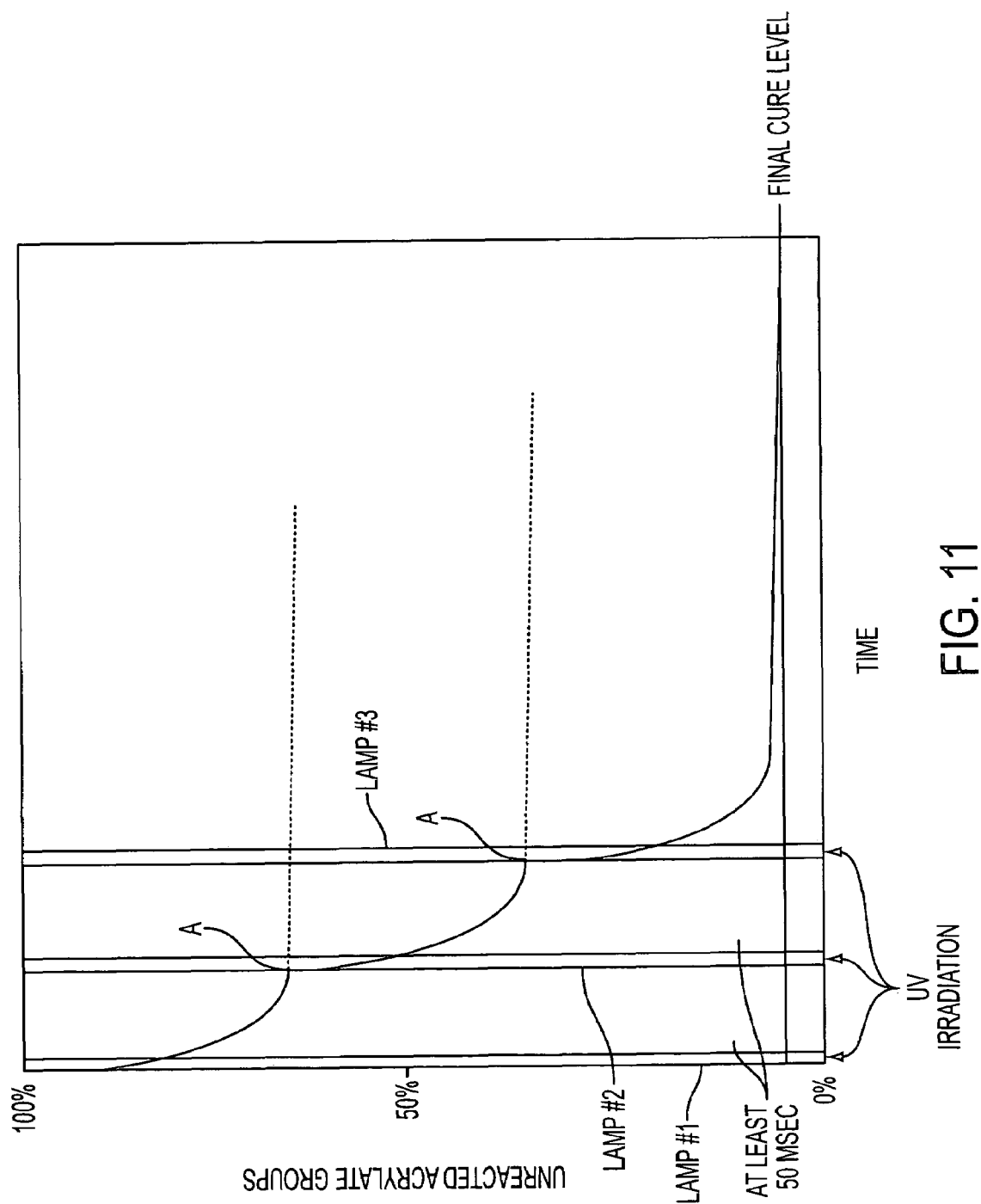
FIG. 11 is a cure graph showing the percentage of unreacted acrylate as a function of time with lamp spacing according to the present invention.

FIG. 11 is a cure graph similar to FIG. 10, showing the unreacted acrylate groups in a fiber coating as a function of time in a configuration according to the present invention. The graph also depicts real time absorbance at the 810 wavenumber peak in the infrared spectrum while the coating is irradiated from three UV lamps (as in FIG. 10). However, the spacing of the lamps are made in accordance with one embodiment of the present invention showing that the dark-cure polymerization of the first initiated group comes to its substantial completion before the second irradiation occurs (again at point A). With this increased spacing each of the initiated polymerization reactions are allowed to progress to substantial completion before the following initiation. As seen by comparing FIGS. 10 and 11, the final percentage of unreacted acrylate groups left by the present invention is significantly less than under the prior art methods depicted in FIG. 10.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What we claim is:

1. An apparatus for curing a coated fiber, comprising:
   a first coating curing stage which partially cures a first layer of a coating of a fiber passing through said first coating curing stage;
   a second coating curing stage located on line and downstream of said first coating curing stage to further cure said first layer of said coating after said fiber exits said first coating curing stage, wherein the first and second coating curing stages are spaced apart such that the time it takes for said fiber to pass from an exit of said first coating curing stage to an entrance of said second coating curing stage is at least 40 msec;

a coater located downstream of said second coating curing stage to provide a second coating layer onto said fiber, a third coating curing stage which partially cures said second coating layer; and a fourth coating curing stage, located on-line and downstream of said third coating curing stage which further cures said second coating layer after said fiber exits said third coating curing stage, wherein said third and fourth coating curing stages are spaced apart such that the time it takes for said fiber to pass from an exit of said third coating curing stage to an entrance of said fourth coating curing stage is at least 40 msec.

2. The apparatus according to claim 1, wherein the time between said exit and said entrance is at least 100 msec.

3. The apparatus according to claim 1, further comprising a said third coating curing stage located downstream of said second coating curing stage for curing said single layer of said coating.

4. The apparatus according to claim 1, further comprising a cooling stage between said first and second coating curing stages.

5. The apparatus according to claim 4, wherein said cooling stage is an active cooling stage.

6. The apparatus according to claim 1, further comprising at least one cooling stage located between either said first and second coating curing stages or said third and fourth coating curing stages.

7. The apparatus according to claim 1, wherein said first and second coating curing stages contain ultraviolet lamps for providing ultraviolet light onto said single coating layer.

8. The apparatus according to claim 1, wherein said third and fourth coating curing stages contain ultraviolet lamps for providing ultraviolet light onto said second coating layer.

9. The apparatus according to claim 1, wherein the time it takes for said fiber to pass from said exit of said first coating curing stage to said entrance of said second coating curing stage is in a range of 40 msec to 300 msec.

10. An apparatus for curing a coated optical fiber, comprising:

a first on line coating curing stage, responsive to a coated optical fiber, wherein said first curing stage partially cures a first layer of a coating of said coated optical fiber;

a cooling stage having at least one coating cooling device, responsive to said coated optical fiber after said fiber exits said first curing stage;

a second on line caring stage, responsive to said coated optical fiber after said fiber exits said cooling stage, wherein said second curing stage completely cures said first layer of said coating of said coated optical fiber;

a coater which coats said coated optical fiber with a second coating over said first coating;

a third on line coating curing stage, responsive to said coated optical fiber, wherein said third curing stage partially cures said second coating; and a fourth on line curing stage, responsive to said coated optical fiber, wherein said fourth curing stage completely cures said second coating.

11. An apparatus according to claim 10, wherein said coating cooling device flows a cooling gas across said coated optical fiber.

12. A multistage curing, cooling and curing apparatus for curing, cooling and curing a drawn coated fiber, comprising:

an on line partial fiber coating curing device, responsive to the coated fiber, for partially curing a first layer of said coated fiber;

an on line active cooling device, located a predetermined distance downstream of said partial fiber coating curing device and responsive to the partially cured coated fiber, for actively cooling the partially cured coated fiber passing though said cooling device, and providing an actively cooled partially cured coated fiber having an actively cooled partially cured coating;

an on line total fiber coating curing device, responsive to the actively cooled partially cured coated fiber, for totally curing said first layer of said coated fiber, wherein said curing devices are located along a line of draw of said coated fiber;

a coarer which coats said coated optical fiber with a second coating over said first coating;

a third on line coating curing stage, responsive to said coated optical fiber, wherein said third curing stage partially cures said second coating; and a fourth on line curing stage, responsive to said coated optical fiber, wherein said fourth curing stage completely cures said second coating.

13. A multistage curing, cooling and curing apparatus for curing, cooling and curing a drawn fiber, comprising:

a first on line coater, responsive to the fiber, for providing a coated fiber with a first coating layer;

an on line partial fiber coating curing device, responsive to the coated fiber, for partially curing said first coating layer of said coated fiber;

an on line active cooling device, located a predetermined distance downstream of said coating curing device and responsive to the partially cured coated fiber, for actively cooling the partially cured coated fiber passing through all around the circumference thereof, and providing an actively cooled partially cured coated fiber having an actively cooled partially cured first coating layer all around the coated fiber;

an on line total fiber coating curing device, responsive to the cooling partially cured coated fiber, for totally curing said first coating layer of said coated fiber having a totally cured single coating layer all around the coated fiber, wherein said curing devices are located along a line of draw of said fiber;

a second on line coater which Coats said coated optical fiber with a second coating over said first coating;

a third on line coating curing stage, responsive to said coated optical fiber, wherein said third curing stage partially cures said second coating; and a fourth on line curing stage, responsive to said coated optical fiber, wherein said fourth curing stage completely cures said second coating.

14. An apparatus for coating an optical fiber as said optical fiber moves along a draw line, comprising;

a first on line coating applicator for coating said optical fiber with a first coating layer;

a first on line curing device, located downstream of said coating applicator, for partially curing said first coating layer;

a first on line cooling device, located a predetermined distance downstream of said first curing device, for cooling said partially cured first coating layer;

a second on line curing device, located downstream of said first cooling stage, for further curing said first coating layer, wherein said first and second curing devices are located along said draw line such that said first coating layer is cured around an entire periphery thereof;

a second on line coating applicator which coats said coated optical fiber with a second coating over said first coating;

a third on line coating curing stage, responsive to said coated optical fiber, wherein said third curing stage partially cures said second coating; and a fourth on line curing stage, responsive to said coated optical fiber, wherein said fourth curing stage completely cures said second coating.

\* \* \* \* \*